Figure 1:
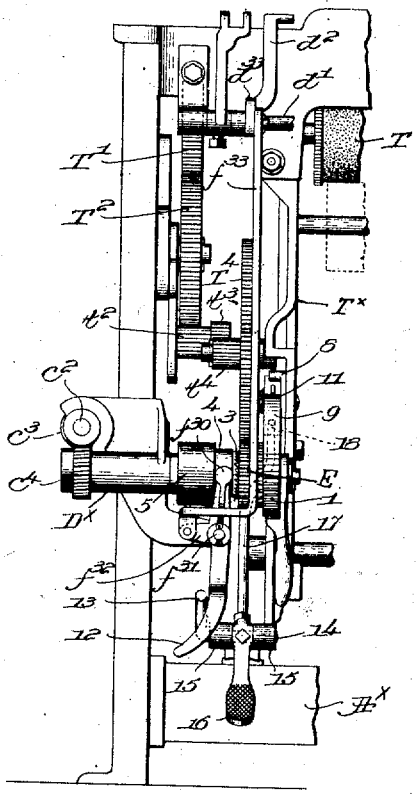

T. NEVIN.

TAKE-UP MECHANISM FOR LOOMS.

APPLICATION FILED MAR. 16, 1909.

Reissued Apr. 20, 1909.

12,944.

Witnesses,
Edward H. Allen.
Joseph M. Ward.

Inventor:
Thomas Nevin,
by Crosby Gregory
Atty's.

UNITED STATES PATENT OFFICE.

THOMAS NEVIN, OF LOWELL, MASSACHUSETTS, ASSIGNOR TO DRAPER COMPANY, OF HOPEDALE, MASSACHUSETTS, A CORPORATION OF MAINE.

TAKE-UP MECHANISM FOR LOOMS.

No. 12,944. Specification of Reissued Letters Patent. Reissued April 20, 1909.

Original No. 913,908, dated March 2, 1909, Serial No. 425,139. Application for reissue filed March 16, 1909. Serial No. 483,724.

*To all whom it may concern:*

Be it known that I, THOMAS NEVIN, a citizen of the United States, and resident of Lowell, county of Middlesex, State of Massachusetts, have invented an Improvement in Take-Up Mechanism for Looms, of which the following description, in connection with the accompanying drawing, is a specification, like characters on the drawing representing like parts.

This invention relates to take-up mechanism for looms and has for its object the production of means whereby at the will of the operator the take-up mechanism can be released from the driving or actuating means therefor so that the take-up can be moved freely by hand, the let-back device for the take-up being rendered inoperative by or through the manual operation of the releasing device.

I have illustrated my invention in connection with a positive and continuously driven take-up mechanism, having a device arranged to let back a predetermined amount whenever the take-up is arrested automatically, as by or through the occurrence of filling absence, a loom of this general type being shown in United States Patent No. 648903 granted to A. D. Emery May 1, 1900.

At times it is desirable to effect manual release of the take-up mechanism from the control of the driving and let-back appliances, so that the weaver may tighten up or slacken the cloth, and herein I have devised a simple device of this character, arranged to be operated by foot pressure at a convenient point at the front of the loom.

The novel features of my invention will be fully described in the subjoined specification and particularly pointed out in the following claims.

Figure 2:
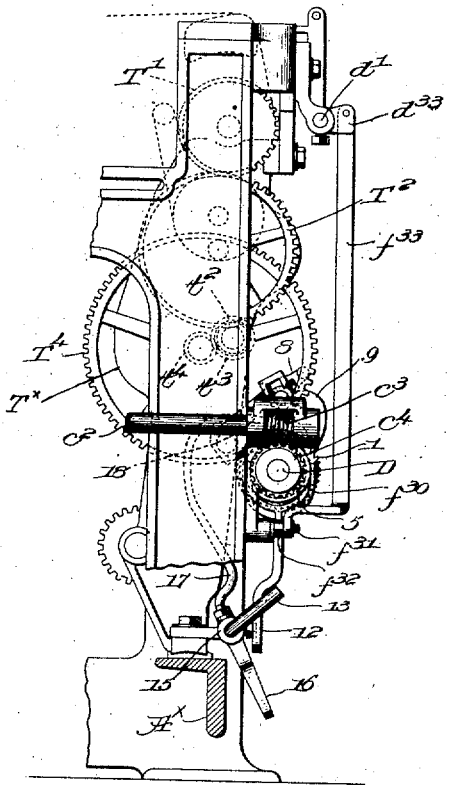
Figure 3:
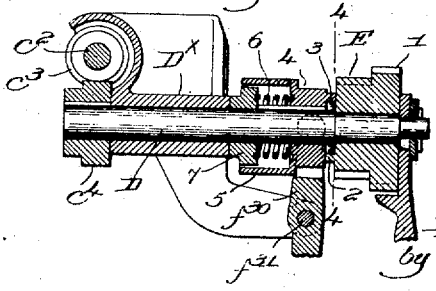
Figure 4:
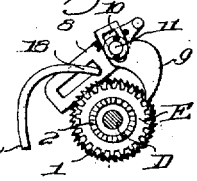

Figure 1 is a front elevation of the main part of the take-up mechanism of a loom, with my invention applied thereto; Fig. 2 is a left hand elevation of the mechanism shown in Fig. 1, the nearer loom-side being broken out; Fig. 3 is an enlarged sectional detail of the clutch connection between the take-up mechanism and the driving means therefor; Fig. 4 is a detail on the line 4—4, Fig. 3, looking to the right, showing the let-back pawl and ratchet.

The take-up roll T has an attached gear $T'$ meshing with a gear $T^2$ driven by a pinion $t^2$, the latter having an attached, larger pinion $t^3$ meshing with a pinion $t^4$ secured to or forming part of a large gear $T^4$, this latter gear being in continuous engagement with a smaller gear E, loosely mounted on a shaft D and having an attached ratchet 1, the train of gearing being substantially of well known construction.

In the construction shown a constantly rotating shaft $c^2$ has a worm $c^3$ in mesh with a worm-gear $c^4$ fast on the shaft D, the latter being mounted in a long bearing $D^x$, as in the patent referred to, but the clutch and let-back devices herein are different in structure.

Clutch teeth 2, Fig. 4, on the side of the gear E are adapted to coöperate with a series of teeth 3 on the movable clutch member 4, splined to the shaft D and cored out at 5 to receive a spring 6, Fig. 3, supported against a collar 7 fast on the shaft, the spring acting to maintain the clutch teeth 2, 3 in engagement, to cause rotation of the gear E with the driving or actuating shaft D, which is continuously rotated, said gear E constituting a driven member.

A bracket 8 is adjustably mounted on the stand $T^x$ for the cloth-roll journal and has mounted thereon a let-back pawl 9 slotted at 10, Fig. 4, to embrace the stud 11 on the bracket, said pawl engaging the ratchet 1 and letting back one or more teeth when take-up is arrested, this pawl being of well known construction. If said pawl lets back say three teeth it will be obvious that whenever the clutch is rendered inoperative the take-up mechanism will be released from control of its driving means and will let back, this same operation taking place in the Emery patent but by different means.

In Figs. 1 and 2 the rock-shaft $d'$ is arranged to control the operation of automatic filling replenishing mechanism, as in the Emery patent, and the arm $d^2$ is arranged to be rocked by the operation of the filling-fork slide when filling absence is detected, said arm having an extension pivotally connected with a depending link $f^{33}$ jointed at its lower end to an arm $f^{32}$ of a yoke $f^{30}$ having a fixed fulcrum $f^{31}$, substantially as in the Emery patent. This yoke coöperates with the sliding clutch member 4 and disengages the clutch teeth 2, 3, when filling absence is detected. Herein I have formed the yoke with a depending, cam-like extension 12 adapted to be engaged by the bent end 13 of a short shaft 14 rotatably mounted in a bearing 15 shown as bolted to the cross-girt $A^{\times}$ of the loom frame, Figs. 1 and 2, the shaft having secured to it a forwardly and downwardly extended foot treadle 16. The treadle has suitably attached to it an upturned, bent arm 17, the free end 18 thereof being extended into position below and back of the let-back pawl 9, as clearly shown in Fig. 4. Normally the knock-off or releasing member 18 exerts no control over said pawl 9, and the automatic operation of the yoke $f^{30}$ is performed with perfect freedom so far as concerns the clutch releasing means just described. If, however, the weaver wishes to move the take-up by hand, supposing the loom to be at rest, he presses down the treadle 16, thereby swinging forward the arm 13 against the cam extension 12, and moving it to the right, Fig. 1, to release the clutch, thus disconnecting the take-up mechanism from its driving or actuating means, and at the same time the knock-off member 18 engages and lifts the let-back pawl 9 from the ratchet 1. The take-up mechanism can now be moved forward or backward by hand, as desired, release of the treadle restoring the parts to normal running position.

Should the weaver wish for any reason to throw the take-up out of operation while the loom is in motion it can be done by the same instrumentality, as will be manifest.

By making the throw-out means for the take-up operative by foot pressure the hands of the weaver are left free to perform any other operation necessary.

Having fully described my invention, what I claim as new and desire to secure by Letters Patent is:—

1. The combination, with take-up mechanism, a continuously-rotating driving member therefor, a clutch between it and said mechanism, and means normally acting to effect and control the amount of let-back when take-up is arrested, of means operated at will to render the clutch inoperative and at the same time release the take-up mechanism from the let-back controlling means.

2. The combination, with take-up mechanism, driving means therefor, a clutch between said means and mechanism, and let-back controlling means normally acting to effect let-back when the clutch is inoperative, of an instrumentality operative at will to simultaneously render inoperative the clutch and the let-back controlling means, said instrumentality including an operating member operated by foot-pressure.

3. The combination, with take-up mechanism, a rotatable driving member, a driven member normally coöperating therewith and in permanent connection with said take-up mechanism, and means normally acting to permit let-back when the driven member is thrown out of operation, of a device adapted to throw the driven member out of operation automatically, and means operative at will to simultaneously release the take-up mechanism from control of the driving member and the let-back means.

4. The combination with take-up mechanism, a rotatable driving member, a driven member normally coöperating therewith and in permanent connection with said take-up mechanism, a ratchet attached to the driven member, and a let-back pawl normally coöperating with the ratchet to effect let-back when the driven member is thrown out of operation, of means operative at will by foot pressure to simultaneously throw the driven member out of operation and disengage the let-back pawl from said ratchet.

5. The combination, with take-up mechanism, driving means therefor, and means normally acting to effect let-back when the driving means is disconnected from the take-up mechanism, of a foot-operated instrumentality to disconnect at will said take-up mechanism and its driving means and simultaneously release said mechanism from control of the let-back means.

6. The combination, with take-up mechanism, driving means therefor, and means normally acting to effect let-back when the driving means is disconnected from the take-up mechanism, of means adapted to disconnect automatically the take-up mechanism and the driving means therefor, and an instrumentality operated at will by foot-pressure to release the take-up mechanism from the control of the driving means and the let-back means.

7. The combination, with take-up mechanism, a continuously-rotating driving member therefor, a clutch between it and said mechanism, and means normally acting to effect and control the amount of let-back when take-up is arrested, of means operated at will to render the clutch inoperative and to release the take-up mechanism from the let-back controlling means.

8. The combination, with take-up mechanism, a rotatable driving member, a driven member normally coöperating therewith and in permanent connection with said take-up mechanism, and means normally acting to permit let-back when the driven member is thrown out of operation, of a device adapted to throw the driven member out of operation automatically, and means operative at will to release the take-up mechanism from control of the driving member and the let back means.

In testimony whereof, I have signed my name to this specification, in the presence of two subscribing witnesses.

THOMAS NEVIN.

Witnesses:
ALBERT W. EDWARDS,
EDWARD DANA OSGOOD.